US012798475B2

(12) United States Patent
Guo et al.

(10) Patent No.: US 12,798,475 B2
(45) Date of Patent: Nov. 17, 2026

(54) CUSTOMIZABLE REPLACEMENT FRONT BUMPER FOR A VEHICLE

(71) Applicant: BOLD PICKUP PARTS INC., Vancouver (CA)

(72) Inventors: Fu Guo, Vancouver (CA); Yongzhi Guo, Vancouver (CA)

(73) Assignee: BOLD PICKUP PARTS INC., Vancouver (CA)

( * ) Notice: Subject to any disclaimer, the term of this patent is extended or adjusted under 35 U.S.C. 154(b) by 355 days.

(21) Appl. No.: 18/411,168

(22) Filed: Jan. 12, 2024

(65) Prior Publication Data

US 2025/0229702 A1 Jul. 17, 2025

(51) Int. Cl.

*B60Q 1/50* (2006.01)
*B60R 16/033* (2006.01)
*B60R 19/48* (2006.01)

(52) U.S. Cl.

CPC ........... *B60Q 1/5035* (2022.05); *B60Q 1/525* (2013.01); *B60R 16/033* (2013.01); *B60R 19/48* (2013.01)

(58) Field of Classification Search

CPC .... B60Q 1/5035; B60Q 1/525; B60R 16/033; B60R 19/48

See application file for complete search history.

(56) References Cited

U.S. PATENT DOCUMENTS 1,507,702 A 9/1924 Harris
3,196,265 A 7/1965 Ziegler
5,060,122 A 10/1991 Miyoshi
7,231,734 B2 6/2007 Gray et al.
7,478,492 B2 1/2009 Madonia
7,527,308 B2 5/2009 Buniewicz et al.
D757,316 S 5/2016 Wymore
9,663,028 B2 5/2017 Parkes et al.
9,840,218 B1 12/2017 Wymore
D840,573 S 2/2019 Wymore
D877,671 S 3/2020 Baker
10,755,613 B2 8/2020 Brubaker
10,981,496 B2 4/2021 Schaye
11,364,840 B2 6/2022 Guenther et al.
11,518,327 B2 12/2022 Wymore
12,311,835 B2 * 5/2025 Bourque ................ G06T 11/60
2006/0290158 A1 12/2006 Cullison (Continued)

FOREIGN PATENT DOCUMENTS

CN 201773557 U * 3/2011
CN 202029737 U 11/2011

(Continued)

OTHER PUBLICATIONS

Machine translation of CN-201773557-U (Year: 2026).*

(Continued)

*Primary Examiner* — Michael Pervan

(74) *Attorney, Agent, or Firm* — BACON&THOMAS, PLLC

(57) ABSTRACT

A customizable, easy-to-install replacement bumper for vehicles includes an integral solar-powered display screen. To simplify replacement of the OEM front bumper, the replacement bumper includes openings, connection structures, and hardware configured to match those of an OEM bumper, so that the installer is not required to cut or drill holes in either the vehicle or the bumper.

19 Claims, 6 Drawing Sheets

(56) References Cited

U.S. PATENT DOCUMENTS

| | | | | |
|---|---|---|---|---|
| 2015/0353031 | A1* | 12/2015 | Cairo | B60R 25/33 340/425.5 |
| 2017/0046929 | A1* | 2/2017 | Strom | G08B 25/08 |
| 2019/0174279 | A1* | 6/2019 | Verma | G07B 15/063 |
| 2024/0409026 | A1* | 12/2024 | Bourque | B60Q 1/5035 |

FOREIGN PATENT DOCUMENTS

| | | | | | |
|---|---|---|---|---|---|
| CN | 221678678 | U | * | 9/2024 | |
| JP | 2005289212 | A | * | 10/2005 | |
| JP | 3156393 | U | * | 12/2009 | |
| WO | WO-2023004159 | A1 | * | 1/2023 | G10L 25/57 |

OTHER PUBLICATIONS

Machine translation of CN-221678678-U (Year: 2026).*
Machine translation of JP-3156393-U (Year: 2026).*
Machine translation of JP-2005289212-A. (Year: 2026).*

* cited by examiner

CUSTOMIZABLE REPLACEMENT FRONT BUMPER FOR A VEHICLE

BACKGROUND OF THE INVENTION

1. Field of the Invention

The present invention relates to an aftermarket or replacement front bumper for a vehicle, and in particular to a replacement front bumper that is customizable.

The customizable replacement front bumper of the invention includes a display screen capable of displaying various designs and multimedia to provide a more varied and attractive appearance for the front of the vehicle, and optionally to display messages and/or warnings.

In an exemplary embodiment of the invention, the display screen is an LED screen. In addition, the replacement front bumper of the exemplary embodiment of the invention may include a solar panel for providing power to the display screen.

In addition, the customizable replacement front bumper of the exemplary embodiment is configured for simplified installation by a consumer, without the need to cut or drill mounting openings in the vehicle itself.

2. Description of Related Art

Existing front bumpers for vehicles fall under two types: original equipment manufacturer (OEM) bumpers and aftermarket bumpers that replace OEM bumpers.

OEM front bumpers are a stock version of what the vehicle was supplied with, and generally have a dull appearance. Because of the high cost of stamping and tooling, OEM front bumpers maintain the same appearance over many years or generations of the vehicle.

In order to change the appearance of the front of the vehicle, consumers have traditionally had little choice but to adapt aftermarket bumpers, which offer slight variations in appearance but are very difficult for consumers to install. Currently-available aftermarket front bumpers are usually made of steel or aluminum, and therefore tend to be very heavy (some weigh as much as 200 lbs.), and require cutting or drilling of the vehicle itself in order to be installed. As with OEM front bumpers, not much can be done to alter their appearance once the bumpers have been installed.

The present invention addresses these deficiencies by integrating a display screen into the aftermarket or replacement front bumper. The display screen allows the appearance of the front bumper to be changed by controlling the display. While it is well-known to provide vehicles with display screens that display messages, none of the previously-proposed vehicle message displays is integrated into a front bumper, so as to enable the appearance of the front bumper to be varied. For example, taxis, trucks and buses may be provided with "billboards" that display advertisements. These display screens are placed on the top, rear, or sides of the vehicle exterior for optimal visibility, and are commonly connected by wires or cables to a controller within the vehicle. Examples of such display screens are disclosed in U.S. Pat. Nos. 10,755,613, 9,963,028, 7,478,492, and 7,231,734, U.S. Patent Publication No. 2006/0290158, and Chinese Patent Publication No. 202029737. For example, U.S. Pat. No. 9,963,028, which discloses a display screen that replaces a vehicle's rear license plate assembly and is supplied with data through a Wi-Fi connection to a controller in the vehicle.

In contrast, proposals to vary the appearance of the bumper itself have generally required replacement of the entire bumper, rather than use of a display screen. An exception is found in U.S. Pat. No. 7,527,308, which provides a bumper structure that allows the appearance of the bumper to be changed by including a replacement outer member that can be substituted for an original outer member, without having to replace the underlying bumper structure. Even though replacement of a part of the front bumper is simpler than replacing the front bumper, however, it is not as simple as controlling a display screen to vary the appearance of the bumper.

One conventional way to change the appearance of, or add decorative effects to, the front of a vehicle is to add a light bar. However, such light bars are generally arranged to be mounted on the OEM front bumper, rather than integrated into a replacement bumper, and do not provide the versatility of an LED or similar display screen. For example, U.S. Pat. No. 11,518,327 discloses mounting of a light bar on a front bumper, but only by including a pivotal assembly mounted in a non-replaceable OEM bumper. Similarly, a front-bumper-mounted, smartphone/app-controlled light bar is described in https://trailrecon.com/lod-offroad-destroyer-truck-front-bumper-20in-led-light-bar-center-screen-silverado-2500hd3500-sierra-2500hd3500-ram-25003500-f-250f-350-mlm2021.html, but the light bar is also an add-on unit for the OEM front bumper, rather than a unit that is integrated into a replacement bumper. The webpage https://www.f150leds.com/collections/2015-18-f150-leds/products/18_paladin_bumper_bar_led also discloses light bars that may be added to the front of the vehicle, while the Color Grille LED Kit described in https://rgbhalokits.com/products/grill-lighting-kit-1?_pos=1&_psq=grill+lighting+kit&_ss=e&_v=1.0 is designed to be integrated into a vehicle grill. While the Color Grille LED Kit description does include a reference to "Smartphone control with optional Bluetooth Controller," there is no suggestion of integration into a replacement bumper.

U.S. Pat. Nos. 1,507,702, 3,196,265, and 5,060,122 also disclose integrating a light assembly or light bar (as opposed to a display screen) into a front bumper, but the front bumpers appear to be OEM front bumpers rather than replacement bumpers. In addition, U.S. Design Pat. No. D757,316 discloses a light bar mounted to a front bumper, while U.S. Design Pat. No. D877,671 discloses a "lighted bumper accessory" and U.S. Design Pat. No. D840,573 discloses a "vehicular front light bar."

None of these commercially-available light bars, or the previously proposed vehicle exterior message display screens, is integrated into a replacement front bumper for a vehicle. Furthermore, the commercially-available front-mounted light bars are generally for illumination purposes only (in contrast to vehicle display screens), and are not capable of providing changeable decorative effects or messages.

One especially advantageous feature of the claimed invention is that the display screen is integrated into an aftermarket bumper configured for simplified user installation. This is accomplished by configuring the bumper with connection positions that match those of the OEM bumper, so that there is no need for drilling holes in the vehicle during installation.

U.S. Pat. No. 10,755,613 discloses modeling of a vehicle in order to match a decorative multi-media or message display screen to contours, hardware, etc. of a vehicle, and therefore the concept of manufacturing a part to fit mounting configuration and hardware of an OEM part, but involves customization of the display screen rather than customization of a bumper into which the display screen is integrated.

On the other hand, as explained above, U.S. Pat. No. 7,527,308, discloses a "modular" bumper structure attachable to a vehicle bumper sub-structure, and in which the appearance of the bumper may be changed by substituting a modified outer member of the bumper. However, the modular bumper does not integrate a display screen.

Finally, the present invention not only integrates a display screen into a vehicle front bumper, but may also provide a power supply that is separate from the vehicle power supply, so that the display screen can be used even when the vehicle's engine is not running, without draining the vehicle's battery. This is accomplished by including at least one solar panel in the replacement front bumper. None of the previously-proposed vehicle display screens or light bars are powered through the vehicle's electrical system rather than by a separate, external, solar power system.

SUMMARY OF THE INVENTION

It is accordingly a first objective of the invention to provide a replacement front bumper assembly for a vehicle that allows a vehicle owner to vary the appearance of the front of the vehicle by replacing the OEM front bumper, and yet that is easy for the vehicle's owner to install without special skills, tools, or equipment, and in particular without having to drill or cut any openings into the vehicle frame or body parts in order to accommodate the replacement bumper.

It is a second objective of the invention to provide a display screen for the front of a vehicle that is easy to install, resistant to road hazards such as flying object, and that has an improved human machine interface.

It is a third objective of the invention to provide a display screen for the exterior of a vehicle that does not take power from the vehicle's battery. display screen, can display various designs and multimedia that solve the drawback of dull appearance of the OEM front bumper.

It is a fourth objective of the invention to provide a replacement for the OEM front bumper of a vehicle that, through an integrated display screen, can display various designs and multimedia that solves the drawbacks of dull appearance of the OEM front bumper.

The objectives of the invention are achieved, in an exemplary embodiment, by providing a customizable, easy-to-install replacement bumper for vehicles, that includes an integral display screen. To simplify replacement of the OEM front bumper, the replacement bumper may include openings for headlights and (optionally) fog lights, as well as for OEM mounting bolts and rivet clips, and/or mounting bolts or rivet clips that are configured to match those of an OEM bumper, so that the installer is not required to cut or drill holes in either the vehicle or the bumper. This eliminates the drawback of aftermarket style front bumpers that their installation often requires cutting or drilling of the vehicle itself in order to be installed. The replacement front bumper of the exemplary embodiment of the invention effectively provides a plug-and-play replacement style front bumper in which the connection positions and connection hardware (such as clips and bolts) to the vehicle (including car lights) are exactly the same as the OEM front bumper, thereby ensuring that the replacement front bumper can be accurately and securely connected to the original car or truck. Conventional aftermarket front bumpers can take up to 4 hours to install, whereas the replacement front bumper of the exemplary embodiment would take under an 1 hour.

To reduce weight and to facilitate configuration of the front bumper to replace different OEM bumpers, the replacement front bumper of the exemplary preferred embodiment may be made of a suitable plastic material such as, by way of example and not limitation, polyvinyl chloride (PVC), acrylonitrile butadiene styrene (ABS), polyethylene (PE), or polycarbonate.

Also included in the replacement front bumper of the exemplary embodiment is a display screen, which may be an LED screen, and which is integrated into the replacement front bumper by a sealing and shock absorbing frame and corresponding gaskets and mounting hardware. The display screen enables the appearance of the vehicle front to be changed by displaying different designs, art, multimedia, and/or messages or warnings.

In order to provide power without draining the vehicle's battery, the replacement front bumper of the exemplary embodiment of the invention may include a solar power supply system for charging and powering up the display screen. The solar power supply system may include a transparent solar panel situated in front of the LED screen to protect the display screen, and/or a flexible solar panel that extends around and covers upper front and side portions of the bumper, as well as a battery for storing generated solar power, and cables for connecting the solar panel and transparent solar panel to the battery, and for connecting the battery to the LED display screen.

Data and control signals for the LED display screen may be provided through a data cable or Wi-Fi connection to the in-vehicle infotainment system, and optionally through a mobile app, allowing a user to easily change the appearance of the front of the vehicle by changing patterns or colors on the display screen, and to display messages such as warnings to pedestrians in the path of the vehicle.

These and other advantages of the invention may be understood in connection with the following description of exemplary embodiments of the invention, with reference to the appended drawings.

DETAILED DESCRIPTION OF THE PREFERRED EMBODIMENTS

A customizable replacement front bumper assembly constructed in accordance with the principles of a preferred embodiment of the invention includes a front bumper, a connection structure for attaching the front bumper assembly to a vehicle, a solar power supply system, and an LED screen control system.

Figure 1:
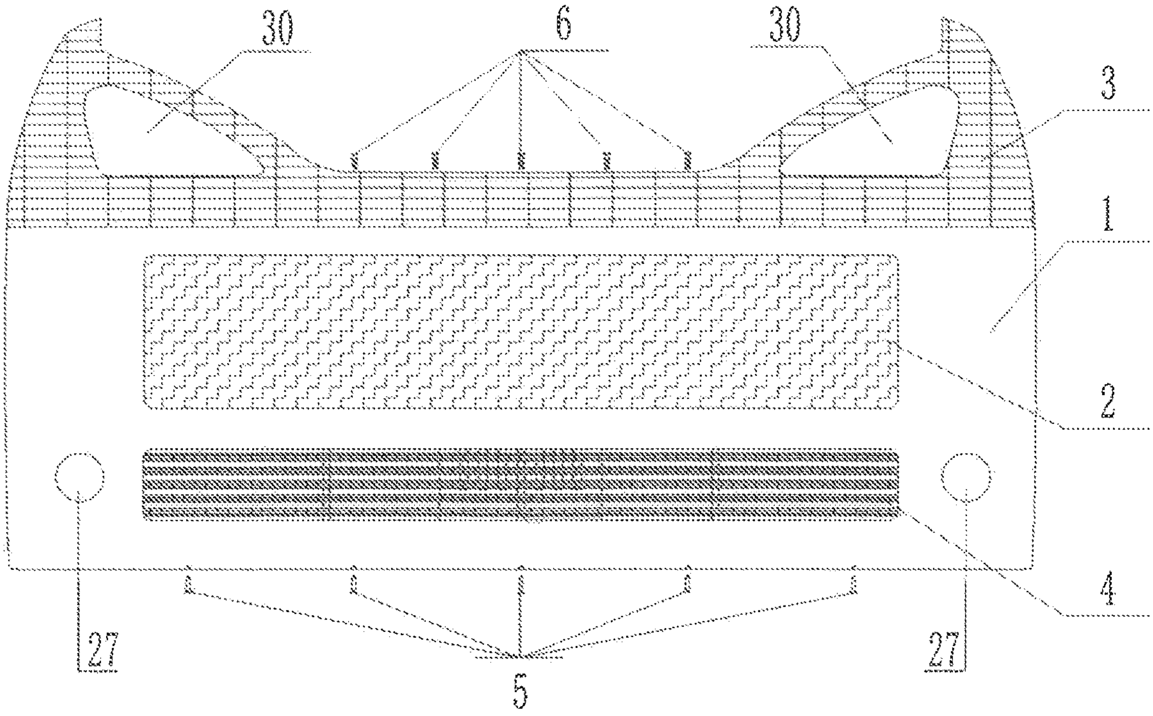
FIG. 1 is front view of a replacement front bumper assembly constructed in accordance with the principles of an exemplary embodiment of the invention.
Figure 2:
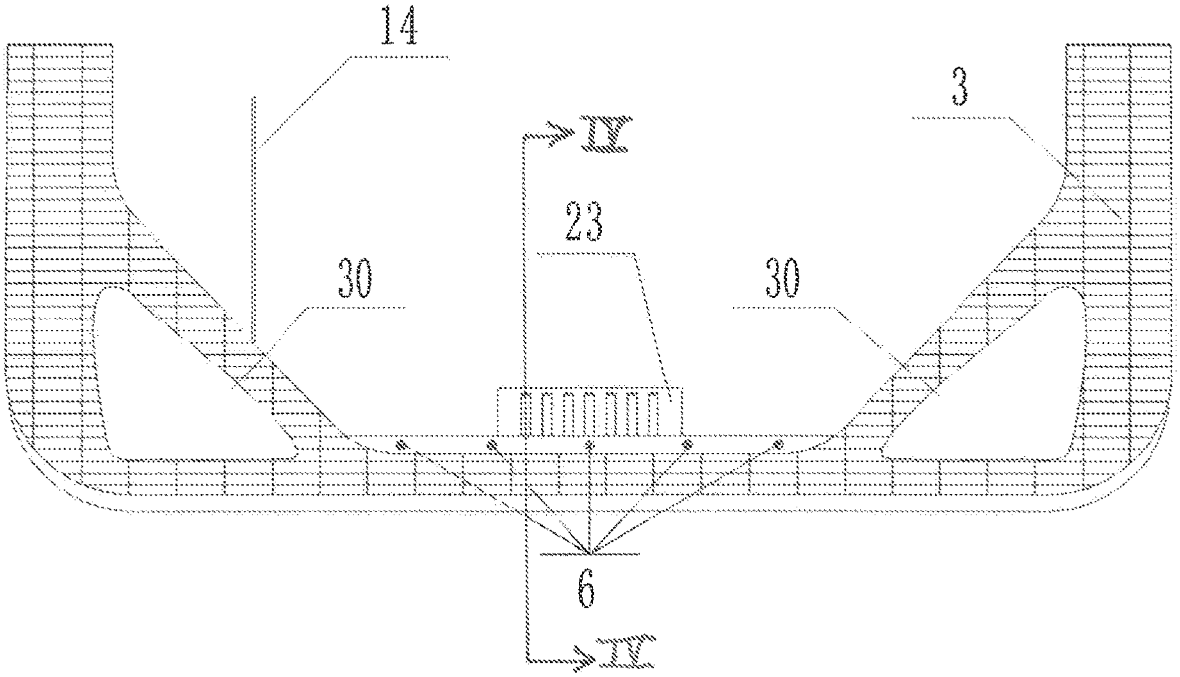
FIG. 2 is a top view of the front bumper assembly of FIG. 1.
Figure 3:
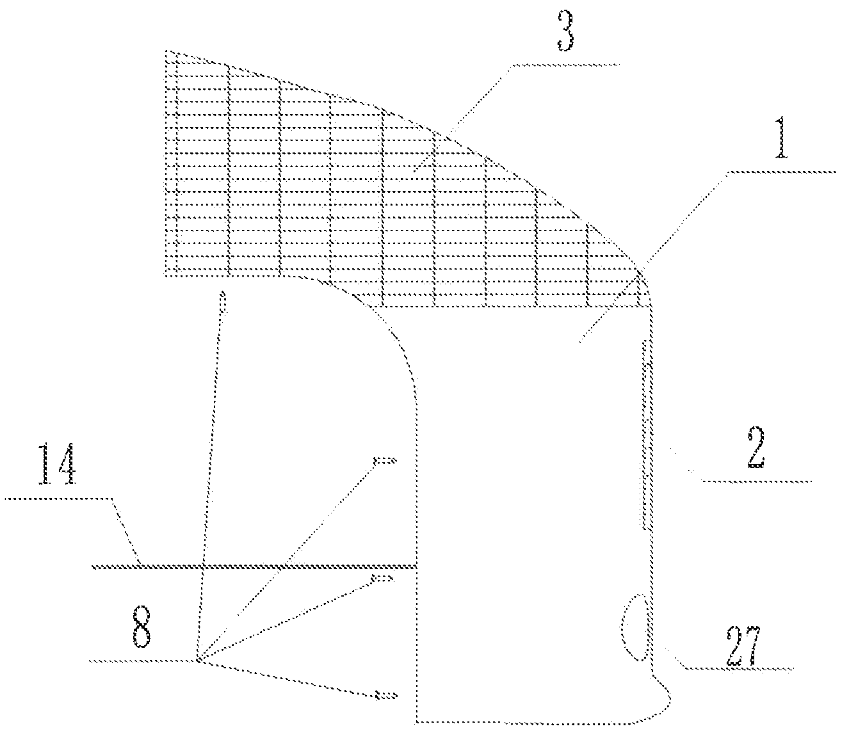
FIG. 3 is a left side view of the front bumper assembly of FIG. 1.
Figure 4:
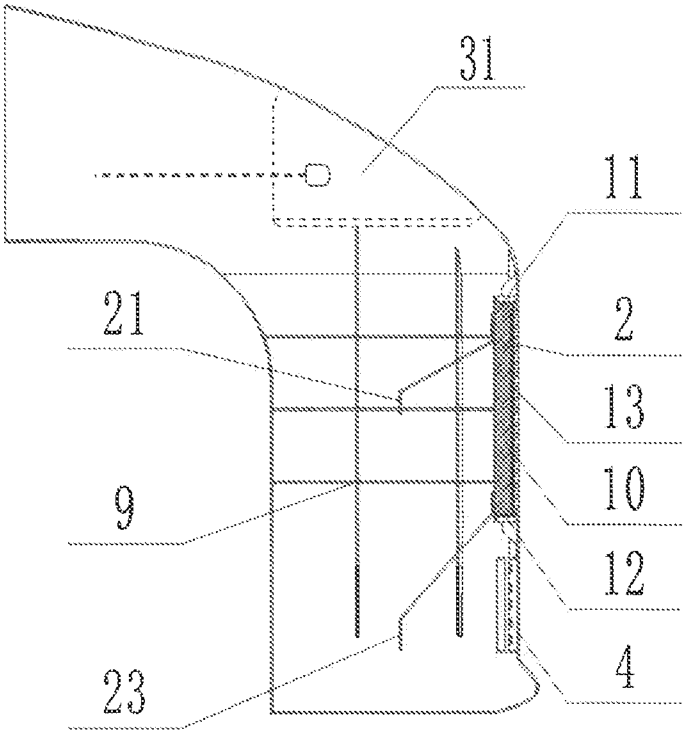
FIG. 4 is a cross-sectional side view of the front bumper assembly of FIG. 1, taken along line IV-IV in FIG. 2.
Figure 5:
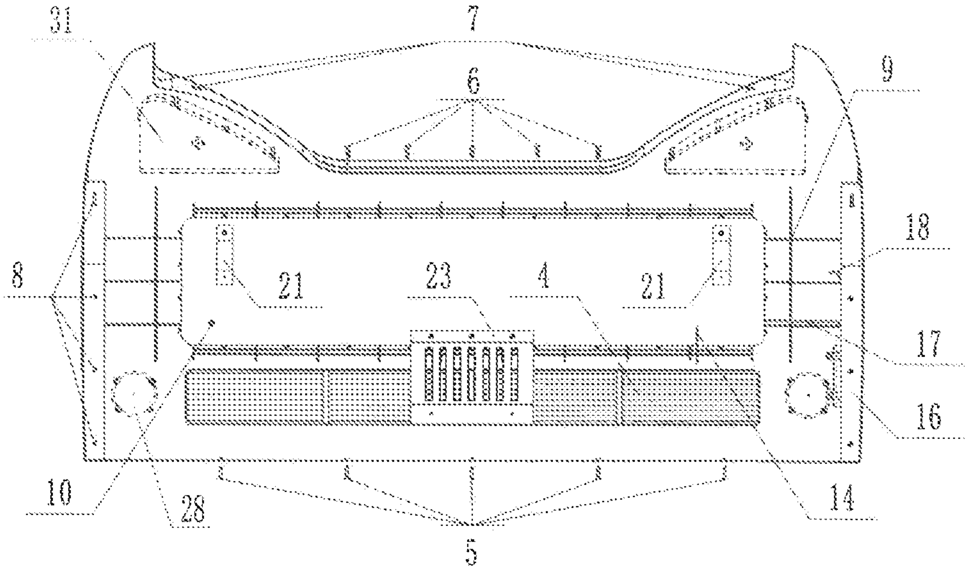
FIG. 5 is a rear view of the front bumper assembly of FIG. 1.
Figure 6:
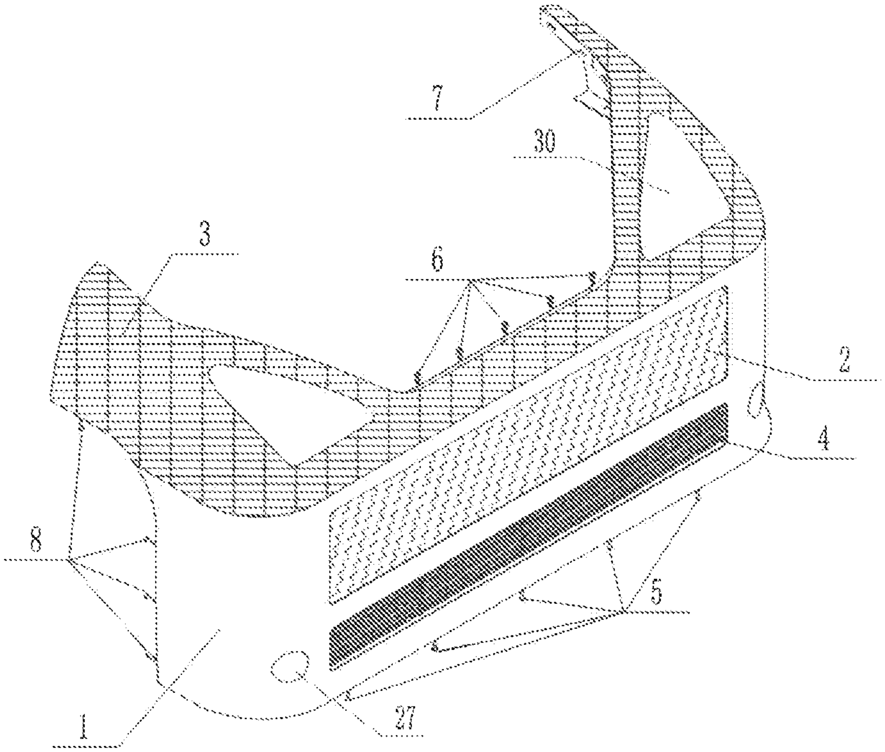
FIG. 6 is a front isometric view of the front bumper assembly of FIG. 1.
Figure 7:
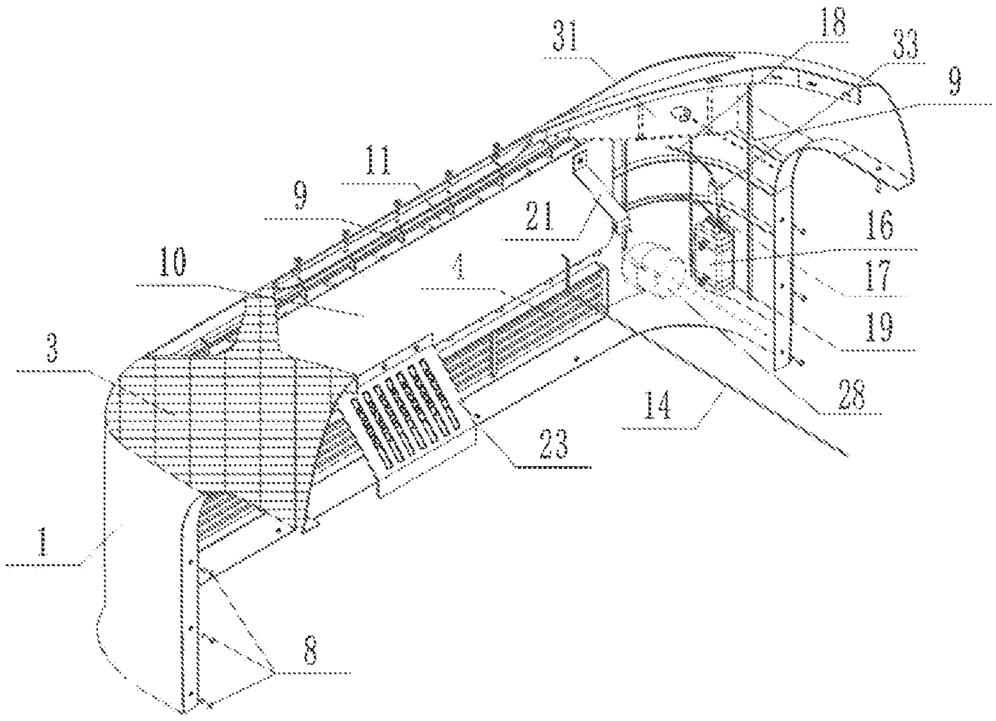
FIG. 7 is a rear isometric view of the front bumper assembly of FIG. 1.
Figure 8:
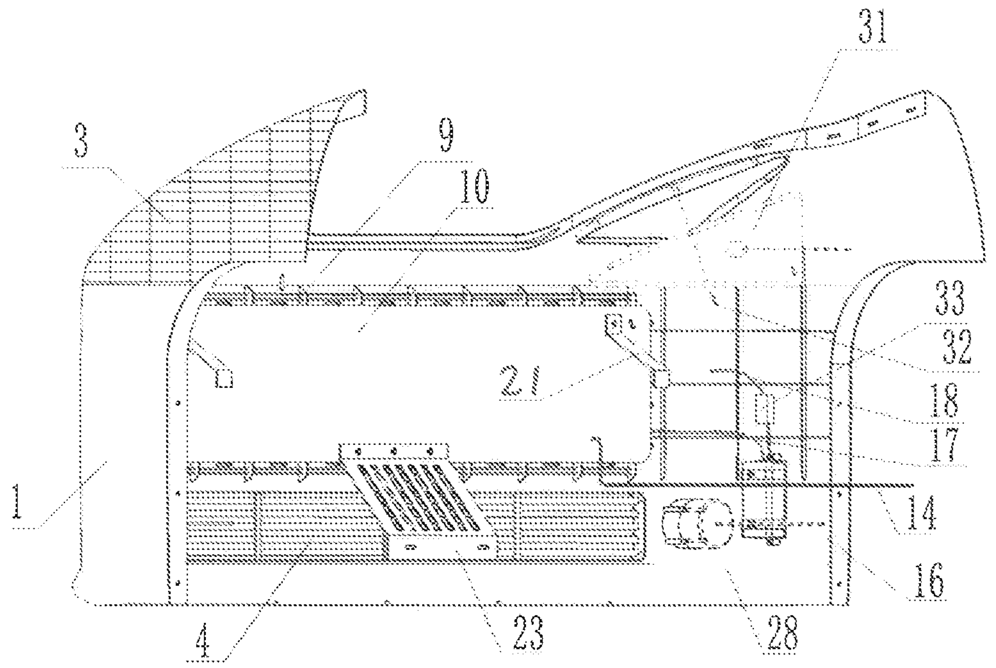
FIG. 8 is a second rear isometric view of the front bumper assembly of FIG. 1.
Figure 9:
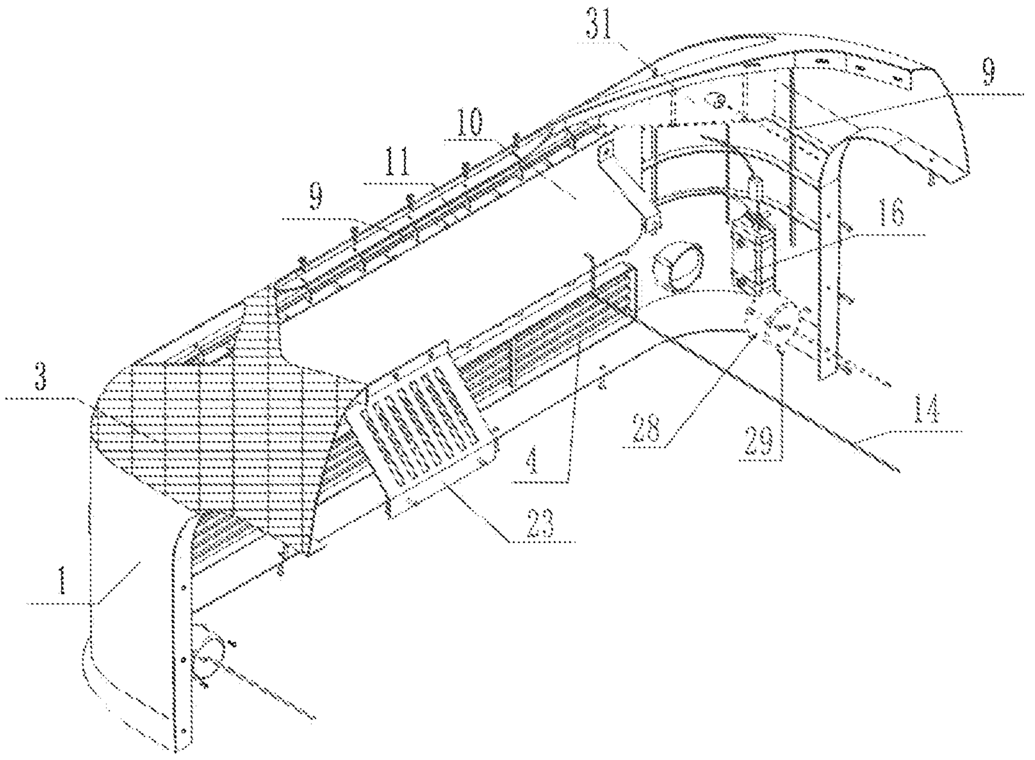
FIG. 9 is a third rear isometric view of the front bumper assembly of FIG. 1.
Figure 10:
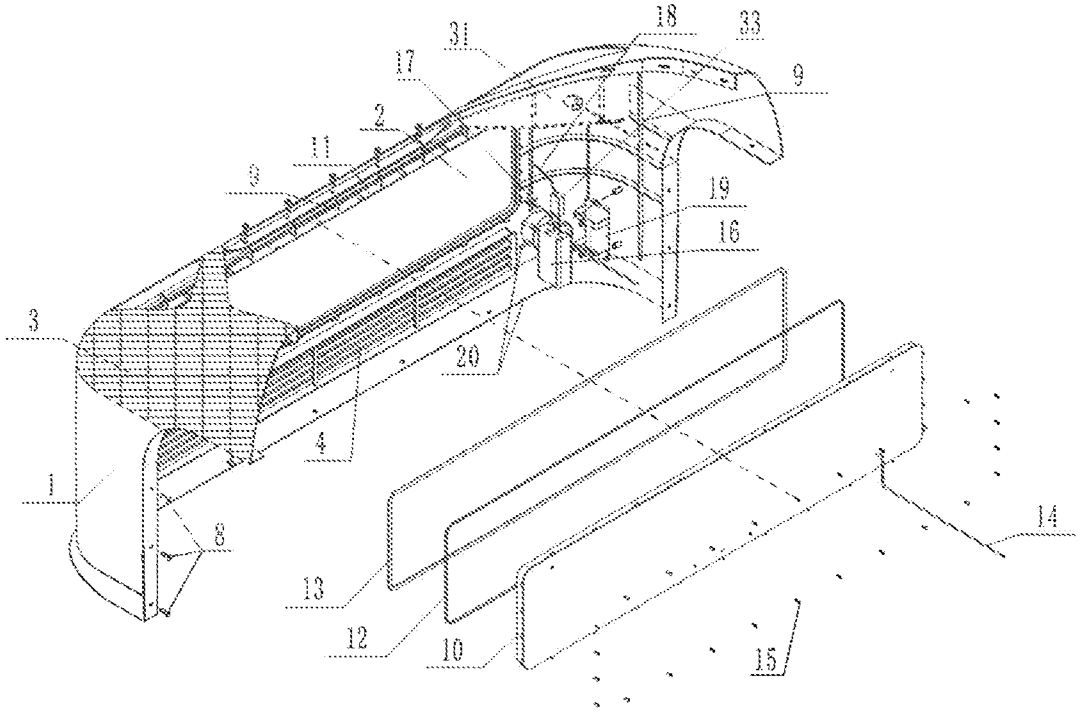
FIG. 10 is an exploded rear isometric view of the front bumper assembly, as shown in FIG. 9.
Figure 11:
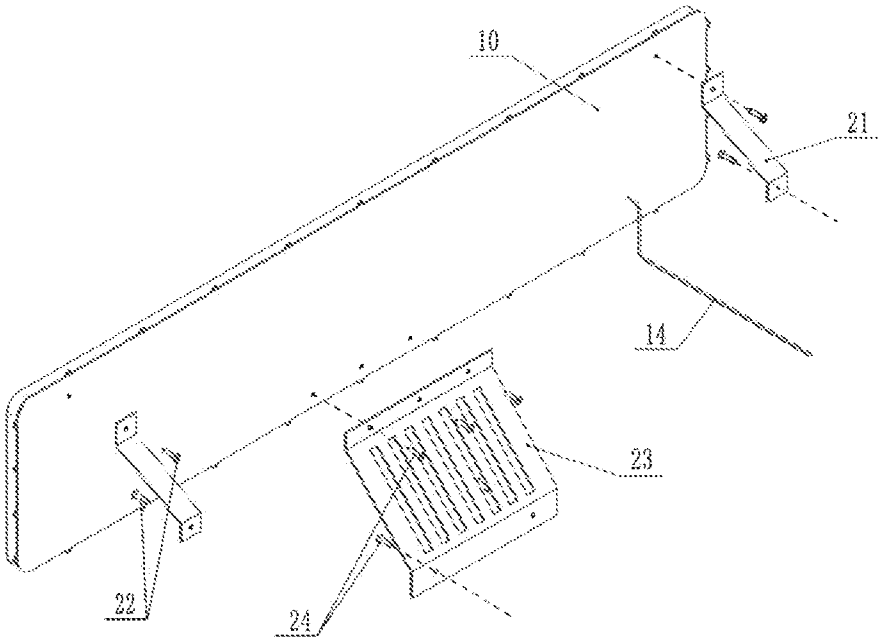
FIG. 11 is a rear isometric view of the LED display screen of the front bumper assembly of FIG. 1, together with mounting hardware and a connection cable.

As shown in FIGS. 1-10, the front bumper 1 of the replacement front bumper assembly is configured to replace an OEM front bumper of a vehicle. In the illustrated embodiment, the front bumper 1 has an inverted L-shape, when viewed from the side, so that the bumper extends around and is securable to a fender of the vehicle, as well as to structures at the front of the vehicle's engine compartment. The shape of the front bumper 1 does not need to be identical to the shape of the OEM bumper (not shown), but is preferably configured so that the front bumper 1 can be secured to the vehicle in the same way that the OEM bumper was secured to the vehicle, using identical mounting hardware that fits into corresponding mounting structures in the vehicle, without the need to drill additional holes in, or otherwise modifying, the vehicle. Bolts 8, shown in FIGS. 3 and 6, fit through corresponding openings in the vehicle, and are matched to openings in the bumper 1. Similarly, bolts 5, shown in FIG. 6, are matched to corresponding openings in the frame of the vehicle, at the lower front of the engine compartment, while rivet clips 6, shown in FIGS. 5 and 6, are provided at the top of the bumper 1 to clip onto the vehicle frame at the upper end of the front of the vehicle. Positioning slots 7 are arranged to accommodate corresponding projecting structures, hardware, or fixtures on the OEM bumper.

To reduce the weight of the replacement bumper, facilitate configuration of the replacement bumper to replace OEM bumpers with different shapes and sizes, and to simplify assembly by a user of the replacement bumper to a vehicle, the replacement front bumper of the exemplary preferred embodiment may be made of any suitable plastic material including, by way of example and not limitation, polyvinyl chloride (PVC), acrylonitrile butadiene styrene (ABS), polyethylene (PE), or polycarbonate.

Each of the bolts 5 and 8, clips 6, positioning slots 7, and other structures on the illustrated replacement front bumper are arranged to match those of the OEM bumper, so that the replacement bumper 1 fits perfectly into the space vacated when the OEM bumper is removed. It will therefore be understood by those skilled in the art that any of the structures illustrated in FIGS. 1-10 may be omitted if not required to accommodate corresponding structures present on the OEM bumper, and that the positions and shapes of the illustrated structures will depend on, and may be varied in accordance with, the positions and shapes of corresponding structures in the OEM bumper and vehicle, to ensure that neither the vehicle nor the replacement bumper needs to be modified by a consumer when replacing the OEM bumper with the illustrated bumper 1.

The connection structure of the replacement front bumper assembly to the vehicle thus may include, by way of example and not limitation, the following parts: a bottom bolt 5, rivet clip 6, positioning slot 7, fender positioning bolt 8, upper support bracket 21, upper support bracket bolt 22, lower support bracket 23, and lower support bracket bolt 24. The front bumper 1 is equipped with the positioning slots 7, which are identical to the connection slots in a corresponding OEM front bumper for the vehicle. the front bumper 1 can be securely connected to the vehicle by pushing positioning slots 7 against the vehicle's embedded clips, which are positioned to meet the positioning slots 7. The front bumper 1 also connects to the vehicle by fastening bottom bolt 5, rivet clip 6, and fender positioning bolt 8 against the vehicle's own connection slots. The upper support bracket 21 connects an LED screen 10, described in more details below, to the vehicle frame using upper support bracket bolt 22, and the lower support bracket 23 connects the LED screen 10 to the vehicle frame using lower support bracket bolt 24. This arrangement ensures that the front bumper 1 installs precisely to the vehicle, and supports the weight of the LED Screen 10.

Front bumper 1 also includes openings 31 for headlights, and optional fog light openings 27 if the vehicle is equipped with fog lights. The openings 31 and 27 are preferably identical, or substantially identical, to those of an OEM front bumper. The OEM fog light openings 27 on the front bumper 1 are cut out according to their OEM position and shape to ensure that the OEM fog light 28, if present, can be connected to the OEM fog light opening 27 using the OEM fog light hardware 29. The OEM headlight opening 30 in the solar panel 3 (described below) is cut out to their OEM position and shape. This ensures that the OEM headlight 31 can be connected to the OEM headlight opening 30 using the OEM headlight hardware 32.

As best shown in FIGS. 4, the front bumper 1 of the exemplary embodiment includes an integral LED screen assembly made up of the LED screen 10 and a transparent solar panel 2 positioned in front of the LED screen 10, so that the LED screen is visible through the transparent solar panel 2. Transparent solar panel 2 therefore provides power to the LED screen 10 and also acts as a protective barrier against potential impacts such a flying debris. The content displayed on the LED screen 10 is a way to customize the bumper's appearance. The LED screen 10 can display any kind of art, video, messaging that makes the bumper appear unique, and can also provide a way to communicate with pedestrians as a means to avoid collision.

The LED screen 10 and transparent solar panel 2 are positioned in an opening at the front of the bumper 1, supported by an LED positioning frame 11, and sealed by a positioning frame perimeter gasket 12 and a positioning frame inner gasket 13 that respectively surround a perimeter of the display screen and solar panel so as to provide a seal between the display screen 10 and solar panel 2, and the main body of the front bumper 1.

The positioning frame inner gasket 13 is located between the outer surface of LED screen 10 and the LED screen positioning frame 11. The LED screen 10 is connected to the LED screen Positioning Frame 11 via LED screen positioning bolts 15. When the LED screen 10 is encased within the LED screen positioning frame 11, it first compresses against the positioning frame perimeter gasket 12 to achieve a sealing and shock absorption effect around its perimeter. Then, when the LED screen 10 comes into contact with the positioning frame inner gasket 13, the LED screen positioning bolts 15 are tightened, pressing against the positioning frame inner gasket 13, thus achieving a sealing and shock-absorbing effect for the front of the LED screen 10.

In addition, the display screen 10 may be further secured directly to the vehicle, as described above, by the upper and lower support brackets 21 and 23, which made of a resilient material to accommodate tolerances in the relative positions of the display screen 10 and the vehicle part to which the brackets 21 and 23 are secured by the corresponding support bracket bolts 22 and 24. Frame 11 is located inside the opening of the front bumper 1, and its overall structural strength may be reinforced by an optional front bumper reinforcing rib 9.

Positioned below the LED screen 10 and transparent solar panel 2, and between fog light openings 27 (if included) is another solar power generating structure in the form of a grille structure or billet 4, which is installed over the lower grille opening of the front bumper 1 below the display screen 10. In addition, solar panels 3 may be fitted over a top of the front bumper 1 to provide power for the display screen 10, in addition to the power supplied by the transparent solar panel 2. The shapes and sizes of the billet 4 and solar panel 3 depend on the configuration of the replacement bumper 1.

The exemplary embodiment of the invention also includes a solar power storage and power transmission system having the following parts: a solar battery 16, LED screen power cable 17, and a solar panel power cable 18. Solar battery 16 is situated inside a solar battery bracket 19 and is connected to the front bumper 1 via solar battery bracket bolt 20. The solar battery 16 is provided with two power lines: the LED screen power cable 17 and the solar panel power cable 18. The transparent solar panel 2 and the optional additional solar panel 3 transmit electric energy through the solar panel power cable 18, and then stores the generated electricity in the solar Battery 16. The solar battery 16 then supplies power to the LED Screen 10 through the LED screen power cable 17.

Figure 12:
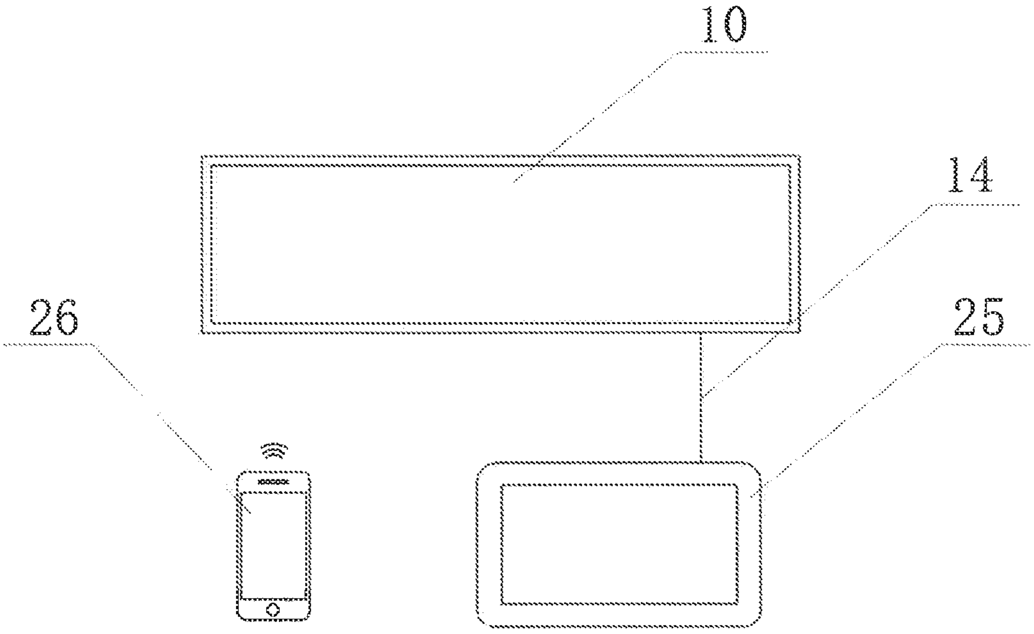
FIG. 12 is a schematic diagram of the control arrangement for the LED display screen of front bumper assembly illustrated in FIGS. 1-11.

Finally, as shown in FIG. 12, an LED screen control system of the illustrated embodiment of the present invention includes the following parts, which enable the vehicle owner to easily change the display and therefore the appearance of the front of the vehicle: LED screen data cable 14, in-vehicle infotainment system 25, and mobile app 26. The mobile app 26 can control the screen display content of the LED Screen 10 through WI-FI. Alternatively, the in-vehicle infotainment system 25 can power the LED screen 10 and control the screen display content through the LED screen data cable 14. Having both control options brings about a good human-computer interaction experience.

Although preferred embodiments of the invention have been described in connection with the appended drawings, it will be appreciated by those skilled in the art that the description of the preferred embodiments is not intended to be limiting. For example, while the exemplary embodiment of the invention includes an LED display screen, it is within the scope of the invention to provide other types of display screens, such as LCD or plasma screens.

Also, although the overall shape and appearance of the replacement front bumper will depend on the overall shape and appearance of the OEM front bumper, the front bumper assembly may nevertheless include parts and features not included in the OEM front bumper if those parts and features do not affect the fit and/or installation of the replacement front bumper.

On the other hand, the exemplary front bumper assembly of the illustrated embodiment may omit features not included in the OEM front bumper. For example, of the OEM front bumper does not include cut-outs for headlights, because the headlights are positioned above the front bumper, then the replacement front bumper also will exclude cut-outs for headlights.

As a result, it is intended that modifications of the preferred embodiments may be made without departing from the scope of the invention, which should be limited solely by the appended claims

What is claimed is:

1. A replacement front bumper assembly for a vehicle, comprising:

a replacement front bumper configured to replace an original equipment manufacturer (OEM) front bumper, wherein the replacement front bumper includes openings for headlights that match openings in an OEM front bumper, and is connected to the vehicle by connection hardware arranged at positions that are the same as the connection hardware and positions used for the OEM front bumper, and further including:

a display screen integrated with the replacement front bumper.

2. A replacement front bumper assembly as claimed in claim 1, further comprising at least one solar panel for providing electrical power to the display screen.

3. A replacement front bumper assembly as claimed in claim 2, wherein the display screen is mounted in a frame fitted into an opening in the front bumper, and the solar panel is a transparent solar panel positioned in front of the display screen to protect the display screen from flying debris.

4. A replacement front bumper assembly as claimed in claim 3, further comprising at least one gasket that extends around the display screen and/or the transparent solar panel to provide a seal between the display screen and/or transparent solar panel and the frame.

5. A replacement front bumper assembly as claimed in claim 2, further comprising a second solar panel fitted to an upper and/or front surface of the front bumper, and/or a solar power generating structure in the form of a billet positioned at the front of the grill below the display screen.

6. A replacement front bumper assembly as claimed in claim 1, wherein the display screen is arranged to display various designs and multimedia.

7. A replacement front bumper assembly as claimed in claim 6, wherein the display screen displays messaging to warn pedestrians of a potential collision.

8. A replacement front bumper assembly as claimed in claim 6, wherein the display screen is connected to receive data and control signals from an Infotainment system of the vehicle.

9. A replacement front bumper assembly as claimed in claim 6, wherein the display screen is connected to the Infotainment system of the vehicle by a cable.

10. A replacement front bumper assembly as claimed in claim 6, wherein the display screen is controllable by a mobile device app.

11. A replacement front bumper assembly as claimed in claim 1, wherein the display screen is an LED display screen.

12. A replacement front bumper assembly for a vehicle, comprising:

a replacement front bumper 1 configured to replace an original equipment manufacturer (OEM) front bumper;

a display screen integrated with the replacement front bumper; and a solar panel mounted on the replacement front bumper to supply power to the display screen.

13. A replacement front bumper assembly as claimed in claim 12, wherein the display screen is an LED display screen.

14. A replacement front bumper assembly as claimed in claim 12, wherein the display screen is mounted in a frame fitted into an opening in the front bumper, the solar panel is a transparent solar panel positioned in front of the display screen to protect the display screen from flying debris.

15. A replacement front bumper assembly as claimed in claim 14, further comprising at least one gasket that extends around the display screen and/or the transparent solar panel to provide a seal between the display screen and/or transparent solar panel and the frame.

16. A replacement front bumper assembly as claimed in claim 12, further comprising a second solar panel fitted to an upper and/or front surface of the front bumper.

17. A replacement front bumper assembly as claimed in claim 16, wherein the display screen is connected to receive data and control signals from an Infotainment system of the vehicle, via a cable.

18. A replacement front bumper assembly as claimed in claim 16, wherein the screen display content of the display screen is controllable by a mobile device app.

19. A system for powering an LED display screen mounted to an exterior of a vehicle, comprising:

at least one solar panel mounted on the vehicle exterior, a battery for storing electricity generated by the solar panel; and at least one power cable connecting the solar panel, the battery, and the LED display screen, wherein the LED display screen, solar panel, and battery are integrated into a replacement front bumper assembly.

* * * * *